No. 733,453. PATENTED JULY 14, 1903.
R. F. W. BEARDSLEY.
MACHINE FOR PASTING UP THE ENDS OF CARTONS, &c.
APPLICATION FILED DEC. 26, 1900.
NO MODEL. 6 SHEETS—SHEET 1.
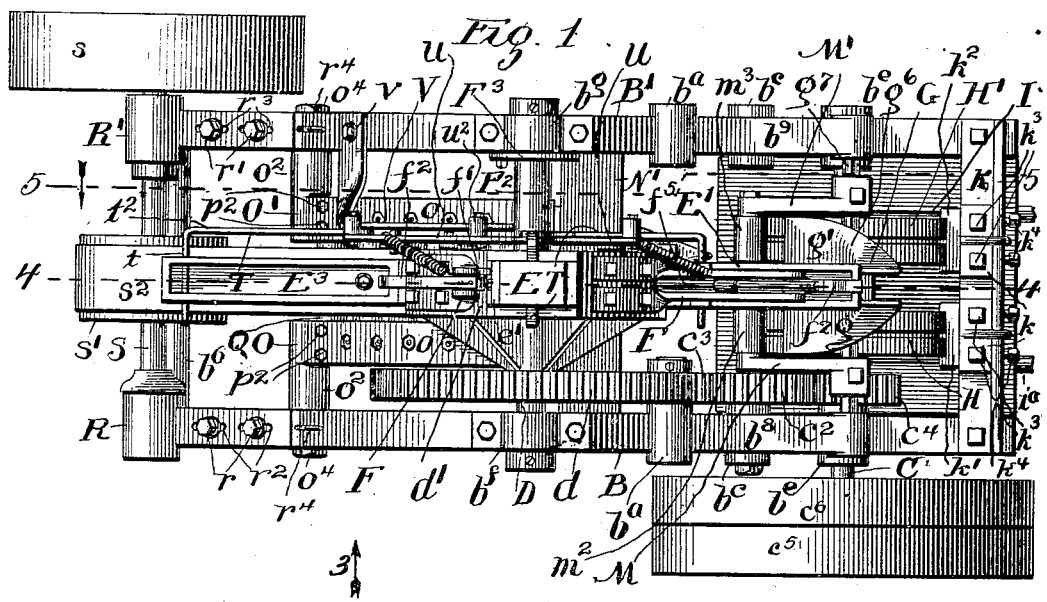
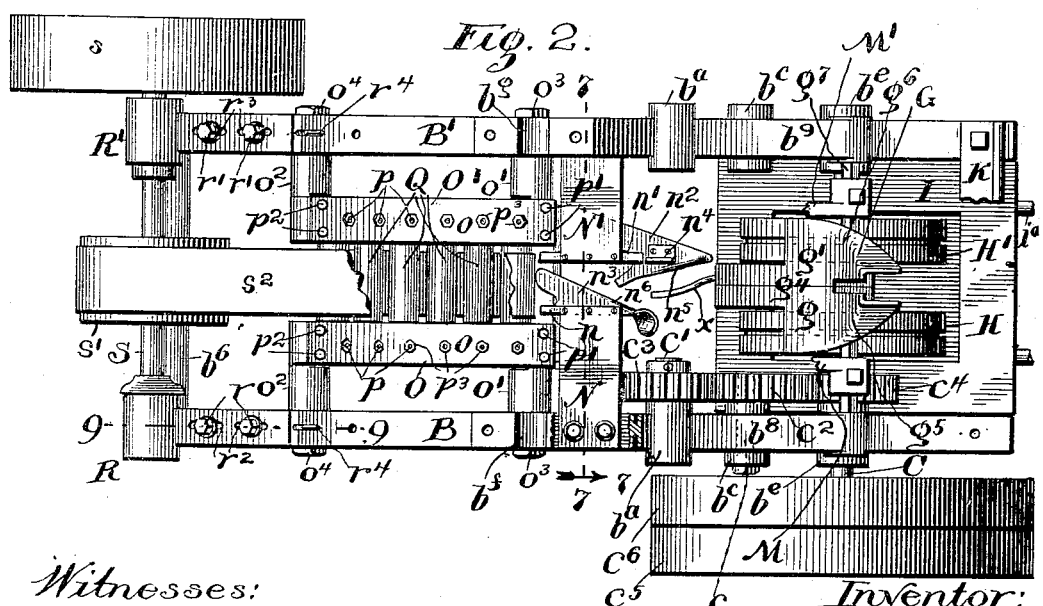
Witnesses:
Chas. O. Shervey
S. Bliss
Inventor:
Robert F. W. Beardsley
by McIntire & Bitner
Attys.

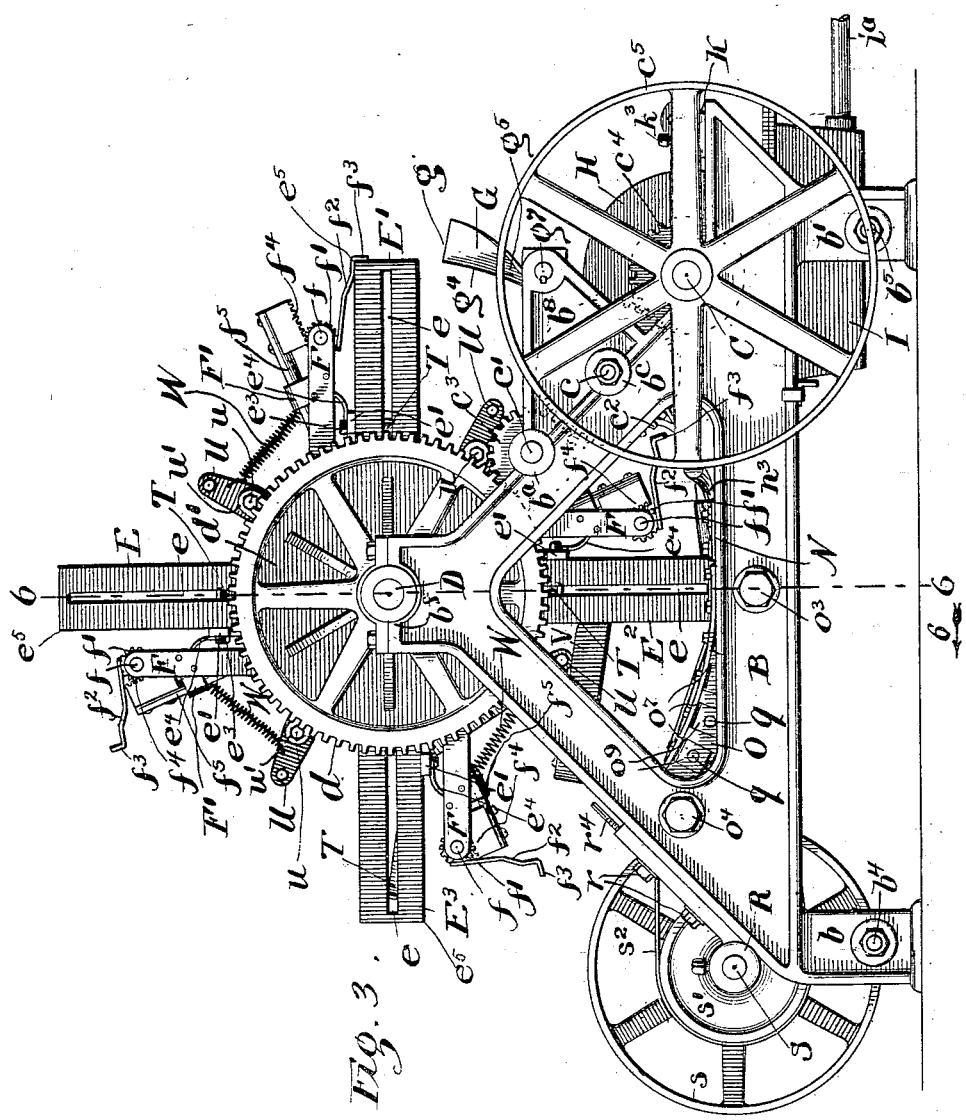

No. 733,453. PATENTED JULY 14, 1903.
R. F. W. BEARDSLEY.
MACHINE FOR PASTING UP THE ENDS OF CARTONS, &c.
APPLICATION FILED DEC. 26, 1900.
NO MODEL. 6 SHEETS—SHEET 3.
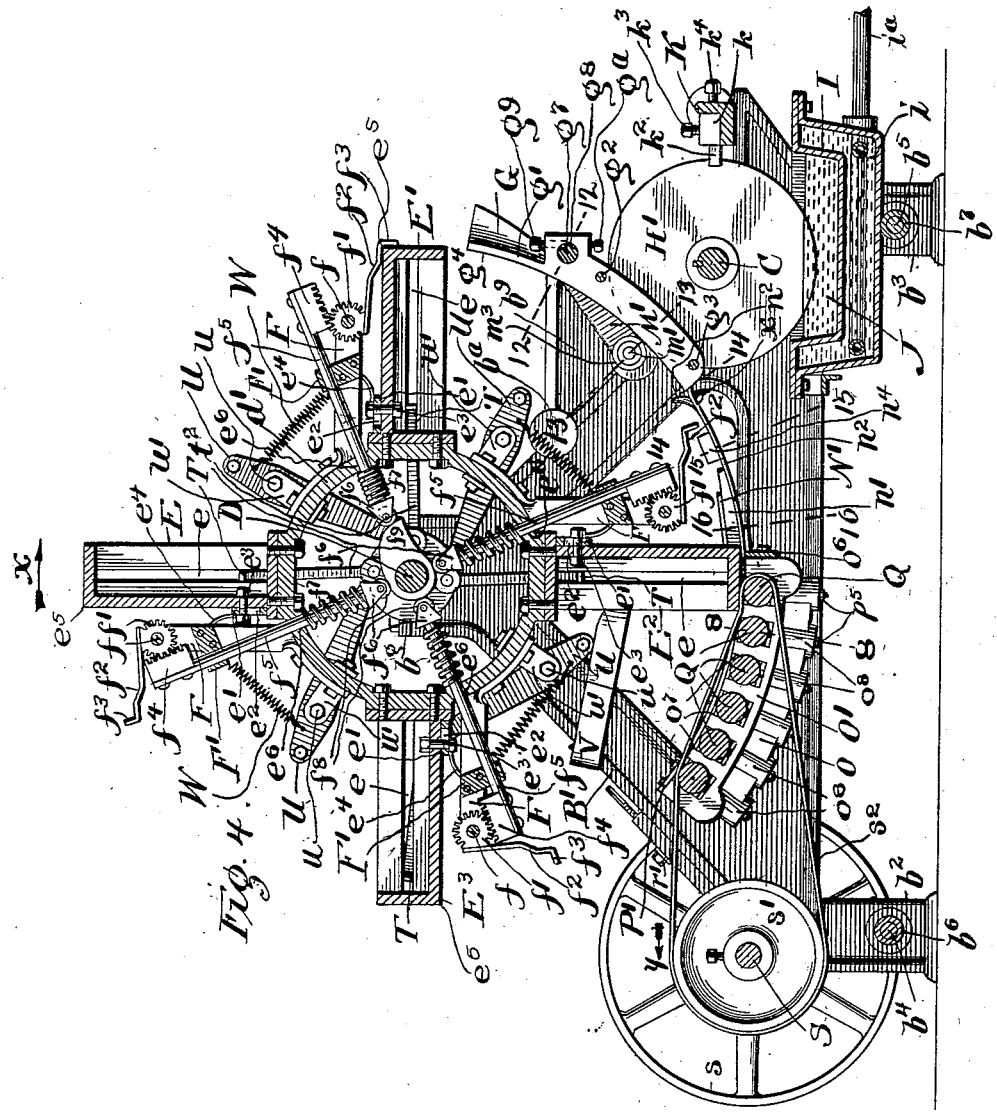
Witnesses:
Chas. O. Shurvey
S. Bliss
Inventor:
Robert F. W. Beardsley
by Wiles Greene & Bitner
Attys.

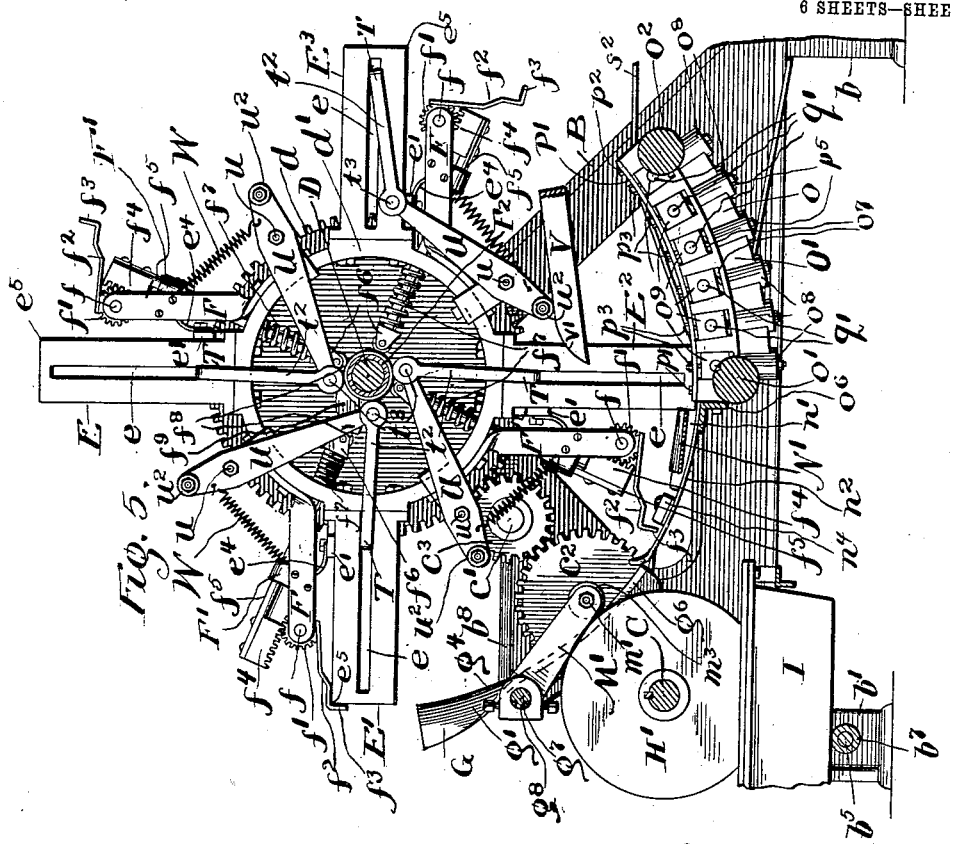
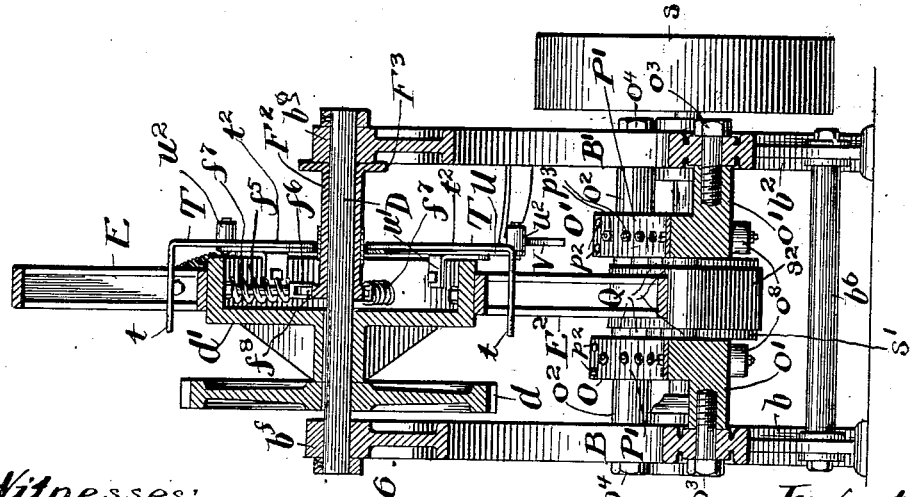

No. 733,453. PATENTED JULY 14, 1903.
R. F. W. BEARDSLEY.
MACHINE FOR PASTING UP THE ENDS OF CARTONS, &c.
APPLICATION FILED DEC. 26, 1900.
NO MODEL. 6 SHEETS—SHEET 5.
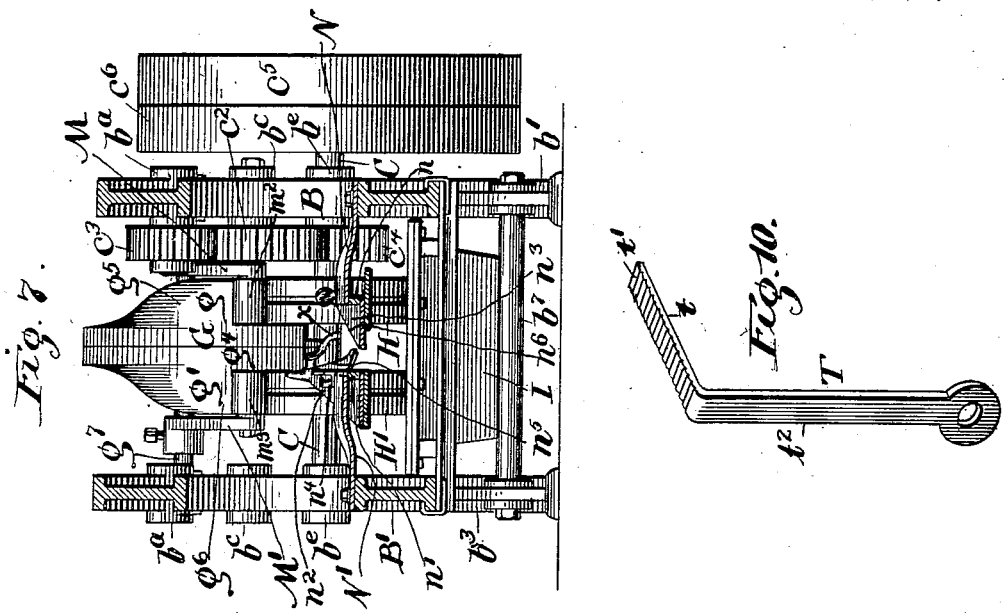
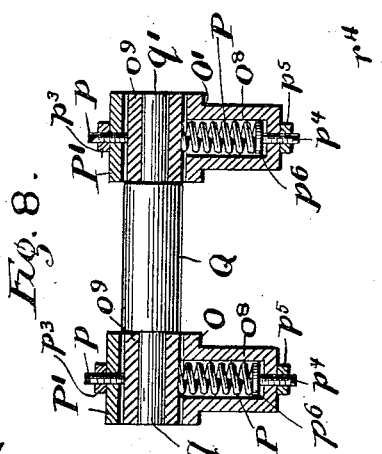
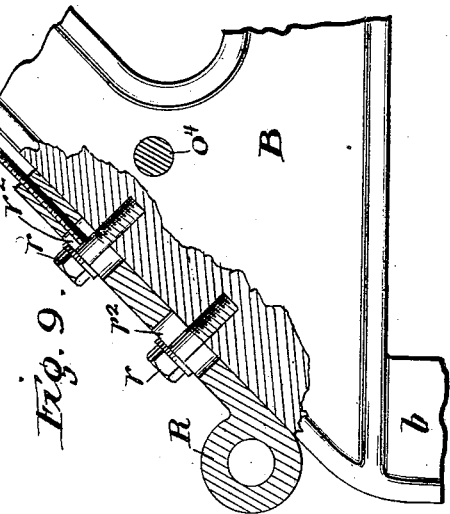

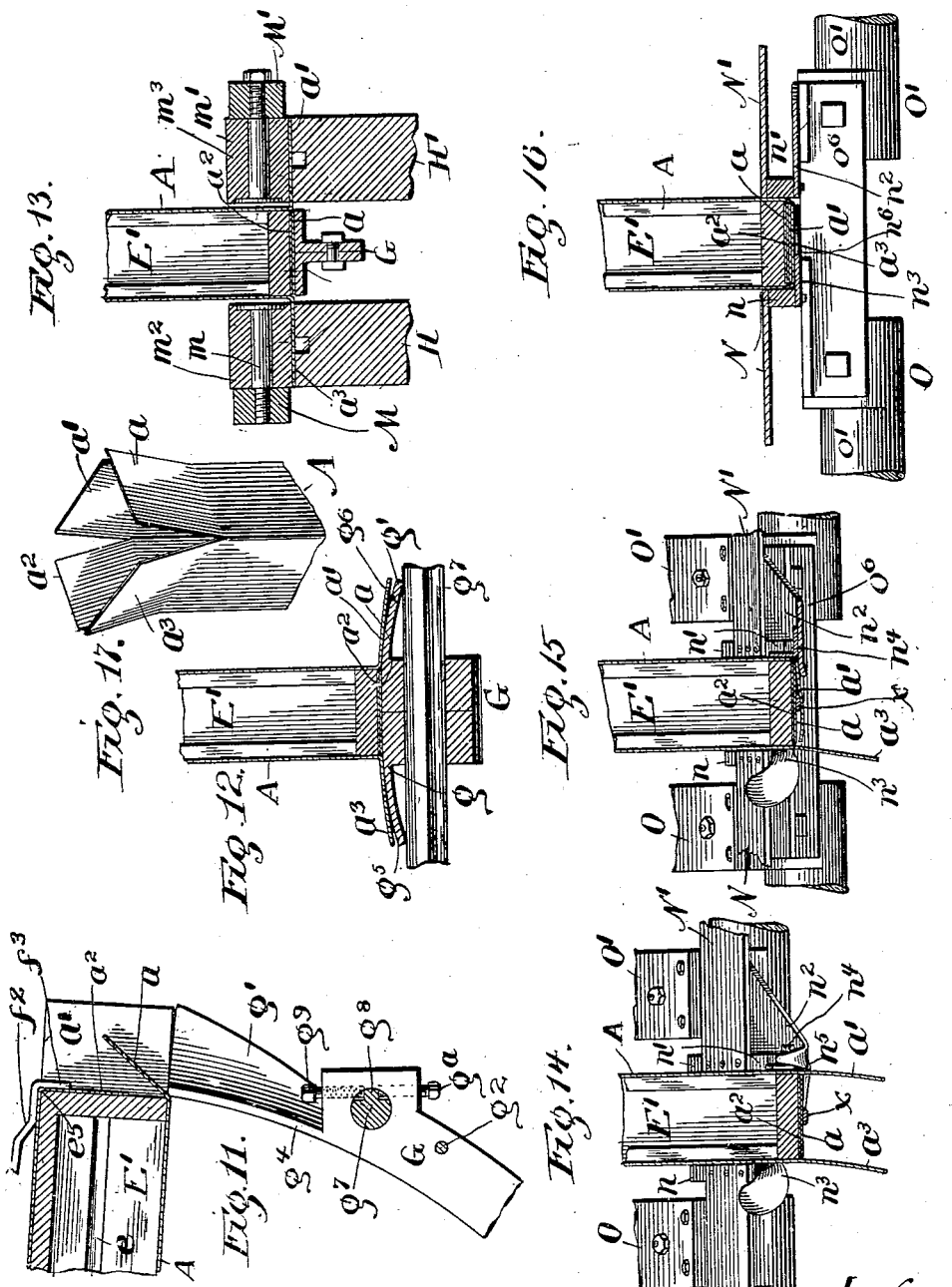

No. 733,453. Patented July 14, 1903.

UNITED STATES PATENT OFFICE.

ROBERT F. W. BEARDSLEY, OF CHICAGO, ILLINOIS, ASSIGNOR, BY MESNE ASSIGNMENTS, TO ISAAC PIESER AND CHARLES G. LIVINGSTON, OF CHICAGO, ILLINOIS.

MACHINE FOR PASTING UP THE ENDS OF CARTONS, &c.

SPECIFICATION forming part of Letters Patent No. 733,453, dated July 14, 1903.

Application filed December 26, 1900. Serial No. 41,065. (No model.)

*To all whom it may concern:*

Be it known that I, ROBERT F. W. BEARDSLEY, a citizen of the United States of America, residing at Chicago, in the county of Cook and State of Illinois, have invented certain new and useful Improvements in Machines for Pasting Up the Ends of Cartons and the Like, of which the following is a specification.

My invention relates to certain machines for pasting up the ends of cartons and the like; and it consists in certain novel devices and combinations thereof adapted to fold together the ends of the cartons, to apply paste to the same in the necessary places, and to press the ends together in the proper relation to effect a complete closure of the end of the package.

My invention is illustrated in the drawings, of which—

Figure 1 is a plan view. Fig. 2 is a view similar to Fig. 1 with the carrier removed and certain other portions broken away. Fig. 3 is a side elevation looking from the arrow 3 of Fig. 1. Fig. 4 is a longitudinal vertical section in the plane 4 4 of Fig. 1 looking in the same direction as Fig. 3. Fig. 5 is a transverse vertical section in the plane 5 5 of Fig. 1 looking in the opposite direction. Fig. 6 is a vertical transverse section in the plane 6 6 of Fig. 3 looking in the direction of the arrow 6. Fig. 7 is a vertical transverse section in the plane 7 7 of Fig. 2 looking in the direction of the arrow 7. Fig. 8 is a detail vertical section in the plane 8 8 of Fig. 4. Fig. 9 is a detail vertical section in the plane 9 9 of Fig. 2, the section being taken to a sufficient depth only to show an adjustable bearing. Fig. 10 is a detail perspective of a push-bar adapted to crowd the carton off of the carrier. Fig. 11 is a detail section similar to Fig. 4, upon a larger scale, and showing the end of one of the carrier-blocks with a carton thereon, showing the portion of the device which operates to fold in two opposite flaps prior to the application of the paste. Fig. 12 is a detail section in the plane 12 12 of Fig. 4, differing from said figure, however, in showing one of the carrier-blocks in the section to illustrate the manner in which the remaining two opposite flanges are spread apart for the application of the paste. Fig. 13 is a detail section in plane 13 13 of said Fig. 4, also showing one of the carrier-blocks in the section to illustrate the manner in which the paste is applied thereto. Fig. 14 is a detail section in plane 14 14 of Fig. 4, showing the carrier-block as having reached this plane and illustrating the turning in of one of the pasted flaps. Fig. 15 is a detail vertical section in the plane 15 15 of Fig. 4, showing the carrier-block in the section and illustrating the turning in of the last flap of the carton. Fig. 16 is a detail section in the plane 16 16 of said Fig. 4, showing the carrier-block in that plane and illustrating the position of the end portions of the carton just prior to their passage upon the pressure-belt and rollers; and Fig. 17 is a perspective of one end of a carton, showing the position of the parts thereof prior to their passage through the machine.

Referring to Fig. 17, one end of a carton A is shown rectangular in transverse section and having the various sides thereof extending at their ends in the form of flaps $a$ $a'$ $a^2$ $a^3$, separated from each other at the corners. The machine of this application is devised to turn in the flap $a^2$ first, then turn in the flap $a$ on top of the former, then to apply paste to the inner surfaces of the flaps $a'$ $a^3$, then to turn in the flap $a'$ on top of the two already turned in, then to turn down the flap $a^3$ on top of all the others, and afterward to apply sufficient pressure to the flaps to glue the flap $a'$ upon the top of the flaps $a$ $a^2$ and the flap $a^3$ on top of the flap $a'$, making a stiff and tight end for the carton, after which the latter is automatically thrust from the carrying-block, leaving the latter in position to receive a new carton.

Taking up the machine itself and looking at Figs. 1 to 4, the framework will be seen to consist of two triangular open side pieces B B', resting upon legs $b$ $b'$ $b^2$ $b^3$, secured together by transverse bolts $b^4$ $b^5$ and tubular struts $b^6$ $b^7$. Upon the side portions of the same near the right-hand end are triangular extensions $b^8$ $b^9$. The side portions of the frame are provided with three transverse bosses $b^a$ $b^c$ $b^c$. The bosses $b^c$ $b^c$ are drilled to provide bearings for the main driving-shaft of the machine C, and the bosses $b^c$ $b^a$ upon one side are bored to receive pins $c$ $c'$, upon which are mounted intermeshing gears $c^2$ $c^3$, the former of which is in mesh with a gear $c^4$ on the driving-shaft C. Driving-pulleys $c^5$ $c^6$, preferably fast and loose, respectively, on the driving-shaft, provide means for imparting power thereto. In the upper portion of the machine are two opposite bearings $b^f$ $b^g$, in which is journaled a shaft D, having fast upon it a gear $d$, in mesh with the gear $c^3$, and a rotating carrier $d'$, provided with radially-projecting carrier-blocks E E' $E^2$ $E^3$, Figs. 3 and 4, preferably hollow and slotted longitudinally through their opposite sides at $e$. These blocks are provided with an adjustable stop $e'$, slotted at $e^2$ and adjustably secured to the blocks by means of bolts $e^3$. The stops are provided with guides $e^4$, diverging from the blocks to prevent the end of the carton from passing over the stop. The gearing described rotates the carrier in the direction of the arrow $x$, seen in Fig. 4, and the carrier-block E is shown in said figure in proper position to receive a carton, which is slipped over said block and is intended to fit closely thereon, with the loose flaps shown in Figs. 17 extending beyond the end of the carrier-block. Just back of each one of the carrier-blocks is a bracket F, secured to the carrier and provided with a stud $f$, upon which is journaled a gear $f'$, carrying a tangentially-projecting finger $f^2$, bent at the point $f^3$ to fit closely over the corner $e^5$ of the carrier-block when brought into proper position by the rotation of the gear. A short rack $f^4$ meshes with the gear and is secured to the end of a sliding rod $f^5$, guided longitudinally in a lateral extension F' of the bracket F and in the carrier at $e^6$. The inner end of the rod bears a fork $f^6$, confining between it and the carrier a coiled spring $f^7$ and embracing between its two arms a roller $f^8$, running upon a cam $f^9$, secured to the end of a sleeve $F^2$, Figs. 1 and 5, fastened to the frame by means of a flange $F^3$. The cam being stationary, the rollers $f^8$ travel over its periphery, and during the passage of one of the carrier-blocks from the position of the block E in Fig. 4 to the position of the block E' the roller $f^8$ runs up to the point of the cam, pushing the rod $f^5$ outward, rotating the gear $f'$, and swinging the finger $f^2$ around into the position shown in connection with the carrier-block E' in said figure and folding in the flap $a^2$ upon the end of the carrier-block, as is shown in Fig. 11.

As the roller runs off of the point of the cam the opposite flap of the carton $a$ strikes the upper end of a guide-plate G and is folded down on top of the flap $a^2$. This guide-plate is preferably made in two parts $g$ $g'$, Fig. 2, secured together by screws $g^2$ $g^3$, Fig. 4, so as to be capable of adjustment as to width when desired. It has a concave face $g^4$ on the side of and concentric with the carrier, which holds the flaps $a$ $a^2$ in position as they pass over it, and oppositely-extending wings $g^5$ $g^6$, converging toward the top, so as to permit the flaps $a'$ $a^3$ to pass on opposite sides and to spread the same apart into the position seen in Fig. 12. This guide-plate is supported upon a transverse shaft $g^7$, secured against rotation at its opposite ends in the triangular extensions $b^8$ $b^9$ of the frame. The shaft is grooved within the shoe to provide a longitudinal rib $g^8$, which is held between two adjusting-screws $g^9$ $g^a$, providing means for angular adjustment of the plate upon the shaft.

On the main driving-shaft C are a pair of gluing-wheels H H', the peripheries of which extend toward the carrier sufficiently to come in contact with the outspread flaps of the carton and the lower portions of which run in a glue-pot I, containing glue J, the pot being provided with a hot-water chamber $i$, heated by means of a steam-pipe $i^a$. A cross-bar K, secured to the frame, is provided with sockets $k$, in which are held scrapers $k'$ $k^2$ by means of set-screws $k^3$. A screw $k^4$ provides means for nice adjustment of the scraper toward or from the gluing-wheel. Upon opposite sides of the guide-plate G arms M M', Fig. 1, are supported upon the shaft $g^7$, so as to be angularly adjustable thereon in the same manner as the plate G. The free ends of these arms are provided with pins $m$ $m'$, carrying rollers $m^2$ $m^3$, extending over and almost in contact with the gluing-wheels. As the carton passes onward from the position shown in Fig. 12 the outspread flaps pass between these rollers and the gluing-wheels, as is shown in Fig. 13, and receive the requisite amount of glue upon their under sides.

Looking at Figs. 2 and 7, two plates N N' will be seen secured to the opposite sides of the frame and extending inward toward each other, being bent upward slightly, as shown in Fig. 7. On the inner ends of these plates are secured guides $n$ $n'$, extending downward and adapted to receive the carton between them. To the lower end of the guide $n'$ is secured a plate $n^2$, and to the lower end of the guide $n$ is secured a plate $n^3$. The plate $n^2$ is provided with a bracket $n^4$, forming an extension of the guide $n'$, and with an oblique edge $n^5$, which engages the flap $a'$ after it leaves the gluing-wheel (for which purpose its end is turned upward, as seen in Fig. 4) and folds said flap inward upon the two already resting against the end of the carrier-block, which are held in that position during the operation by means of a curved rod $x$, secured to the guide-plate G and forming a narrow continuation of the surface thereof. The plate $n^3$ is provided with an oblique edge $n^6$, against which the flap $a^3$ strikes after the flap $a'$ has been folded in and by means of which the flap $a^3$ is folded inward and upward against the other three flaps, completing the folding of the end of the box, which is now ready to pass onward to the pressing-rollers.

Looking at Figs. 2, 4, 5, and 6, two roller-frames O O' will be seen, each composed of an arc-shaped portion $o$, having at its opposite ends laterally-projecting studs $o'$ $o^2$, secured to the respective side piece by means of screws $o^3$ $o^4$. Brackets $o^6$ upon these roller-frames assist in supporting the plates $n^2$ $n^3$, as seen in Fig. 5. Each of the arc-shaped portions of these frames is provided with a series of guides $o^7$ and a series of spring-sockets $o^8$. Between the guides are arranged a series of journal-blocks $o^9$, held in radial adjustment, Fig. 8, between coiled springs P in the sockets and screws $p$, threaded in plates P', secured to the roller-frames by means of bolts $p'$ $p^2$, Fig. 5. Jam-nuts $p^3$ prevent accidental displacement of the screws $p$, and corresponding screws $p^4$, held by jam-nuts $p^5$, are threaded in the bottom of the sockets and provided with disk-shaped upper ends $p^6$ to bear upwardly against the springs. By these devices the limit of upward movement of the journal-blocks is made adjustable, also the tension of the springs tending to hold the blocks up to said limit. Between the opposite journal-blocks are journaled rollers Q, having gudgeons $q$ $q'$, journaled in said blocks.

Looking at Figs. 3 and 9, brackets R R' will be seen secured to the opposite side portions of the frames by means of screws $r$ $r'$, extending through slots $r^2$ $r^3$ in the brackets. An adjusting-screw $r^4$ provides means for a nice adjustment of the bracket. In these brackets is journaled a transverse shaft S, Fig. 4, carrying a driven pulley $s$ and a driving-pulley $s'$, carrying a belt $s^2$, running over the rollers in the direction shown by the arrow $y$ and preferably at a speed slightly greater than that of the cartons as they pass over the belt. This is desirable, because in the various operations of guiding, spreading, and folding the flaps are liable to be forced backward out of shape, and the greater speed of the belt tends to advance them while setting the glue, so as to bring them back into proper relation. The tension of the belt is adjusted by the brackets just described, so that the effect of the belt may be nicely gaged to put the finishing touches on the carton and bring the parts up square and true. During the passage of the carton over the rollers and the belt the glue is sufficiently set to complete the operation as far as the gluing down of the flaps is concerned. It remains merely to force the carton from the carrier-block, and this is effected by means of a series of push-bars T, Figs. 10, 4, and 5, the bent ends $t$ of which extend transversely through the slotted carrier-blocks and are preferably serrated, as shown, at $t'$, Fig. 10, to prevent slipping of the end of the carton thereon. The shanks $t^2$ of the push-bars extend inwardly, as seen in Fig. 5, and are pivoted at their inner ends at $t^3$ to the inner ends of the levers U, pivoted between their ends at $u$ to brackets $u'$, Fig. 4, on the carrier and carrying at their outer ends rollers $u^2$ in position to engage a cam V, secured to the side frame B' at $v$, Fig. 1, and having a curved surface $v'$, adapted to crowd the outer ends of the levers U inward sufficiently to shove the push-bars out toward the ends of the slots and crowd the cartons from the carrier-blocks. Coiled springs W, stretched between the outer ends of the levers U and the extensions F' of the brackets F, tend to draw the push-bars toward the center of the carrier.

The carrier-block E³ in Fig. 4 shows the position in which the carton has been forced from the carrier-block, and in passing from this position to that of the block E in the same figure the roller upon the inner end of the lever runs off of the cam V and the spring W withdraws the push-bar into the position seen in connection with said carrier-block E.

The various novel features of my invention are to a certain extent independent of their specific form and construction, as well as their particular arrangement and combination, and for that reason I do not limit myself in these respects except as set forth in the following claims.

I claim as new and desire to secure by Letters Patent—

1. The combination with a frame and a rotary carrier therein provided with a suitable carton-block, of devices in position to fold the front and lateral flaps down as the movement of the carrier drags the flaps over the same, and means for exerting a contrary frictional pull upon the folded flaps to compensate the rearward pull of the folding devices.

2. In a machine of the class described, the combination with means for constantly advancing a carton, of means for pasting and folding the flaps of the same during such advance, and means for pressing the flaps of the same during such advance and exerting a frictional pull upon them in the direction in which they are moving, substantially as described.

3. In a machine for folding in and gluing the ends of cartons, the combination with a frame, a movable carrier, carton-supporting blocks on the carrier, and a series of guides in the path of the carton as it advances with the carrier and adapted to fold the end flaps of said carton in upon the block, of means for applying glue to the portions of the carton to be secured, means for pressing the end flaps of the carton tightly upon the block to set the glue, and a device to which the carton is brought by the carrier adapted to engage the end of the carton and moving faster than the carrier and in the same direction, whereby the end flaps of the carton are advanced sufficiently to make up for any distortion caused by the guides; substantially as described.

4. In a machine for gluing the end flaps of a carton, the combination with a frame, a movable carrier, and carton-supporting blocks on the carrier, of means for applying the glue, folding-guides through which the flaps are carried, a series of pressing-rollers over which the end of the carton is passed, and a belt running over said rollers and between them and the carton in the same direction and moving more rapidly than the carton; substantially as described.

5. In a machine of the class described, the combination with a frame and a carrier rotating therein about a fixed axis and carrying a radial carton-block, a rear-flap folder moving with said carton-block, means for swinging the folder forward over the block to fold the rear flap, a fixed folder in position to drag the front flap down upon the rear folded flap, means for applying glue to the lateral flaps, and two fixed folders arranged in succession along the path of the carton to fold in the lateral flaps.

6. The combination with a frame, of a carrier mounted in the frame, a carton-block fixed to the carrier and traveling with it in an endless path, a folder and a carton-discharger traveling with the block, devices fixed in the paths of the folder and discharger, respectively, to actuate them as they pass, and a stationary folder, glue-applying devices, a second stationary folder, a third stationary folder, and flap-pressing devices, all arranged in succession along the path of the block between the devices for actuating the folder first mentioned and the discharger.

7. The combination with a frame and a movable carrier mounted therein, carrying a carton-block, of a folder-segment mounted alongside said block and moving therewith, a folding-arm carried by a part of said segment and adapted to swing forward over the end of said block to fold in the rear flap of a carton when the segment is rotated, a rack engaging the segment and a cam fixed in position to actuate the rack and thus the segment and folding-arm, substantially as described.

8. In a machine of the class described, the combination with means for folding and pasting the ends of a carton, and means for advancing the carton after folding it, of a belt arranged to press upon the folded flaps while traveling in the same direction and at a greater speed and means for actuating said belt, substantially as described.

9. In a device of the class described, the combination with a rotating wheel provided with a radial carton-box, means for rotating the wheel and means for folding and pasting the ends of the carton, of a belt adapted to press upon the folded ends while traveling in the same direction, and a plurality of spring-pressed members underneath said belt adapted to hold it in contact with said cartons, substantially as described.

10. In a device of the class described, the combination with a rotating wheel provided with a radial carton-box, means for rotating the wheel and means for folding and pasting the ends of the carton, of a belt adapted to press upon the folded ends while traveling in the same direction, and a plurality of spring-pressed rollers underneath said belt adapted to hold it in contact with said cartons, substantially as described.

11. In a device of the class described, the combination with a carton-carrier, of means upon the carrier for folding the rear flap of the carton, a stationary folder adapted to fold the front flap of the carton, of two stationary curved guides arranged at different points in the path of the carton adapted to turn the side flaps thereof in succession through an arc of one hundred and eighty degrees, into place upon the bottom of said carton, substantially as described.

12. In a device of the class described, the combination with a carton-carrying block, of a pusher-bar adapted to remove the cartons therefrom, a portion of said pusher-bar coming into contact with said cartons, being serrated to prevent slipping, substantially as described.

13. In a device of the class described, the combination with a longitudinally-slotted carton-carrying block, of a pusher-bar, T, having a finger, $t$, at right angles to it, said finger running in the slot of said block, and means for operating said pusher-bar to eject the cartons from said block, substantially as described.

14. In a device of the class described, the combination with a movable carton-carrier, a longitudinally-slotted carton-carrying block secured to said carrier, a pusher-bar, T, having a right-angled finger, $t$, extending through the slot in said block, a lever pivoted at one end to the extremity of said pusher-bar farthest removed from said block, said lever being pivoted between its ends to the periphery of said carrier, a roller upon the end of said lever beyond the periphery of said carrier and a cam in the path of said roller adapted to actuate said lever, and pusher-bar to eject the carton from said block, substantially as described.

15. In a device of the class described, the combination with a movable cylindrical carton-carrier, a longitudinally-slotted carton-carrying block secured to said carrier, a pusher-bar, T, having a right-angled finger, $t$, extending through the slot in said block, a lever pivoted at one end to the extremity of said pusher-bar farthest removed from said block, said lever being pivoted between its ends to the periphery of said carrier, a roller upon the end of said lever beyond the periphery of said carrier and a tangential cam in the path of said roller adapted to actuate said lever and pusher-bar to eject the carton from said block, substantially as described.

In witness whereof I have hereunto set my hand, at Chicago, in the county of Cook and State of Illinois, this 8th day of December, A. D. 1900.

ROBERT F. W. BEARDSLEY.

Witnesses:
CHAS. O. SHERVEY,
S. BLISS.